United States Patent [19]
Klippert et al.

[11] Patent Number: 4,981,907
[45] Date of Patent: Jan. 1, 1991

[54] PROCESS FOR THE PREPARATION OF AN ACRYLATE-VINYL CHLORIDE GRAFT POLYMER

[75] Inventors: Heinz Klippert; Manfred Engelmann, both of Burgkirchen, Fed. Rep. of Germany

[73] Assignee: Hoechst Aktiengesellschaft, Frankfurt am Main, Fed. Rep. of Germany

[21] Appl. No.: 260,445

[22] Filed: Oct. 20, 1988

[30] Foreign Application Priority Data

Oct. 23, 1987 [DE] Fed. Rep. of Germany ....... 3735925

[51] Int. Cl.$^5$ ...................... C08F 265/04; C08L 27/06
[52] U.S. Cl. ......................... 525/82; 525/85; 525/262; 525/263; 525/305; 525/308; 525/317
[58] Field of Search ............... 525/267, 305, 308, 307, 525/317, 82, 85, 262, 263

[56] References Cited

U.S. PATENT DOCUMENTS 3,832,318 8/1974 Gallagher et al. .................. 524/166
3,969,431 7/1976 Gallagher .......................... 525/305
4,719,265 1/1988 Thunig et al. ...................... 525/308

FOREIGN PATENT DOCUMENTS 043611 3/1986 Japan ................................. 325/308

OTHER PUBLICATIONS

Derwent Abstract 16356T-A, abstract of Japanese Patent Publication No. 47-7454 (1972).

Primary Examiner—Lewis T. Jacobs
Assistant Examiner—David Buttner

[57] ABSTRACT

A process is described for the preparation of a polymer which contains, besides polymerized units of vinyl chloride, 30 to 60% by weight, relative to the polymer, of polymerized units of an acrylate, if appropriate together with copolymerizable monomers. The acrylate is firstly polymerized in aqueous emulsion with addition of a monomer containing at least 2 ethylenically unsaturated, non-conjugated double bonds in the presence of a fatty acid salt and in the presence of an alkane- or alkylarylsulfonate. Polymerization in aqueous suspension is then carried out in which vinyl chloride, customary polymerization auxiliaries, a precipitant for the emulsifiers used in the emulsion polymerization, and water are initially introduced, and the acrylate dispersion produced by emulsion polymerization is subsequently added. Polymers of high bulk density and good free-flowing properties which can easily be demonomerized are thus obtained. Mixed with vinyl chloride homopolymers, moldings having good impact resistance and surface quality are obtained with good processability.

7 Claims, No Drawings

PROCESS FOR THE PREPARATION OF AN ACRYLATE-VINYL CHLORIDE GRAFT POLYMER

The invention relates to a process for the preparation of a graft polymer containing polymerized units of vinyl chloride and 30 to 60% by weight, relative to the polymer, of polymerized units of at least one acrylic ester herinafter called "acrylate".

It is known to prepare impact resistant, weathering-stable moldings from mixtures of polyvinyl chloride and graft polymers containing 30 to 60% by weight of acrylate units and vinyl chloride as the polymerized-on monomer. In order to obtain such graft polymers, U.S. Pat. No. 3,832,318 discloses to polymerize acrylates in the presence of small amounts of polyfunctional, ethylenically unsaturated monomers in aqueous emulsion, to add to the polymer dispersion thus produced vinyl chloride, a suspending agent which is suitable for suspension polymerization of vinyl chloride and a catalyst which is soluble in vinyl chloride, to adjust the pH to a value between 3 and 9, and to polymerize this mixture. In order to emulsion polymerize the acrylate, an emulsifier having a low (2 to 12) or very high (above 40) HLB value, for example the sodium salt of bistridecyl sulfosuccinate (HLB=4 to 7) or an alkyl sulfate salt having a short alkyl chain, for example sodium 2-ethylhexyl sulfate (HLB~50), should be employed. In order to prevent deposits forming on subsequent polymerization of the vinyl chloride, a high-viscosity hydroxypropylmethylcellulose is preferably employed.

This process has the disadvantage that the high-viscosity suspending agents recommended are difficult to handle, and customary production plants for polyvinyl chloride are not designed for such high-viscosity substances. The comparative experiment described below furthermore shows that, when an emulsifier having a high HLB value (about 40) is added in the polymerization of the acrylate, a polymer is obtained, after subsequent graft polymerization with vinyl chloride, which has unfavorable porosity, and is thus difficult to degas, and exhibits comparatively low impact resistance, a lower quality surface and worse processability when mixed with polyvinyl chloride and processed to form moldings.

U.S. Pat. No. 4,719,265 discloses a process in which an acrylate is emulsion polymerized in the presence of an alkali metal salt of a fatty acid or in the presence of an alkali metal lauryl sulfate and the subsequent suspension polymerization of the vinyl chloride is carried out in the presence of a methylcellulose, a Ca(OH)$_2$ suspension being added after the suspending agent is added, the mixture is neutralized, and an organic peroxide is then added as an initiator. According to the examples according to the invention, aqueous suspending agent solution and polyacrylate dispersion are initially introduced, vinyl chloride is then added, the mixture is heated, Ca(OH)$_2$ suspension is introduced, the mixture is neutralized using acid and the initiator is finally metered in.

This procedure is complicated and susceptible to faults. It is obviously only possible to use an unfavorable phase ratio (5 parts by weight of water to one part by weight of vinyl chloride), which causes the productivity to suffer. Furthermore, metering in of the initiator in an organic solvent (toluene) can cause residue problems in the finished polymer or in the molding produced therefrom. The bulk density of 450 g/dm$^3$ achieved is unsatisfactorily low for modern extrusion processing.

Finally, JP-AS Sho 47-7454 discloses a process for improving the preparation of granulated polymers which does not relate specifically to polyacrylate-vinyl chloride graft polymers. According to this process, an aqueous suspension comprising a monomer of the ethylene series, a suspending agent and a salting-out agent which is suitable for coagulation of a latex and which does not affect the monomer suspension is treated with a polymer latex, rendered basic if necessary, and the mixture thus produced is polymerized. In none of the examples is a polyacrylate latex employed.

A process has now been found which does not have the disadvantages of the abovementioned processes and results in products having improved properties with good productivity and a procedure which is not susceptible to faults. The novel process for the preparation of a polymer containing polymerized units of vinyl chloride and 30 to 60% by weight, relative to the polymer, of polymerized units of at least one acrylate or at least one acrylate and further monomers which can be copolymerized with acrylates, by polymerization of the acrylate or of the acrylate and the further monomers mentioned with addition of a monomer containing at least two ethylenically unsaturated, non-conjugated double bonds in aqueous emulsion in the presence of a water-soluble salt of a fatty acid containing 12 to 18 carbon atoms as emulsifier having an initial pH of greater than 9, where a polymer is formed whose glass transition temperature is below 0° C., with subsequent polymerization of vinyl chloride or of vinyl chloride and monomers which can be copolymerized with vinyl chloride, in aqueous suspension in the presence of the polyacrylate dispersion produced by emulsion polymerization, and in the presence of at least one vinyl chloride-soluble catalyst which forms free radicals, at least one suspending agent and at least one precipitant for the emulsifier mentioned, at temperatures from 50° to 80° C., cooling, releasing the pressure and working up to the dry polymer comprises carrying out the emulsion polymerization of the acrylate in the additional presence of at least one alkali metal salt or ammonium salt of an alkylsulfonic acid having 8 to 20 carbon atoms and/or of an alkylarylsulfonic acid having 3 to 16 carbon atoms in the alkyl radical as further emulsifier, and introducing water, suspending agent, precipitants for the emulsifiers mentioned, catalyst and vinyl chloride and, if present, further monomers into the polymerization vessel before commencing the suspension polymerization of the vinyl chloride, and then adding the previously produced dispersion of the polyacrylate and warming the mixture to polymerization temperature.

The polymer preparation according to the invention is carried out in two steps. Firstly, at least one acrylate and, if appropriate, further monomers which can be copolymerized with acrylates are polymerized in aqueous emulsion with addition of a monomer containing at least two ethylenically unsaturated, non-conjugated double bonds. Suitable acrylates are, for example, alkyl acrylates containing 3 to 10 carbon atoms in the alkyl radical, such as, for example, propyl acrylate, butyl acrylate, pentyl acrylate, hexyl acrylate, heptyl acrylate, octyl acrylate, 2-ethylhexyl acrylate, nonyl acrylate or decyl acrylate, furthermore arylalkyl acrylates, for example benzyl or phenylpropyl acrylates, and also arylalkyl esters in which the carbon chain is interrupted by ether oxygen atoms, for example phenoxyethoxyethyl acrylate. Acrylates whose homopolymers exhibit a maximum glass transition temperature of −15° C. are preferably used. It is also possible to use mixtures of different acrylates.

Suitable monomers which can be copolymerized with acrylates are, for example, styrene, acrylonitrile, vinyl acetate, alkyl methacrylates having 1 to 8 carbon atoms in the alkyl group, acrylic acid, methacrylic acid and other customary vinyl monomers. Vinylidene chloride is preferably used as the comonomer. The amount of monomer or monomers which can be copolymerized with the acrylate should be selected so that the acrylate copolymer produced has a glass temperature below 0° C. Emulsion polymerization of the acrylate is carried out with addition of a monomer containing at least two ethylenically unsaturated, non-conjugated double bonds. Suitable compounds of this type are, for example, acrylates of polyhydric alcohols, such as ethylene glycol dimethacrylate, diethylene glycol dimethacrylate, propylene glycol dimethacrylate, butylene glycol diacrylate, trimethylene glycol diacrylate, pentamethylene glycol diacrylate, glyceryl triacrylate, trimethylolpropane trimethacrylate, pentaerythritol tetra acrylate; allyl methacrylate, diallyl esters of monofunctional or polyfunctional acids, such as diallyl phthalate, or diallyl fumarate; divinyl esters of dibasic or tribasic acids, such as divinyl adipate; divinyl ethers of polyhydric alcohols, for example of ethylene glycol; divinylbenzene or divinyl sulfone. Of these compounds containing two non-conjugated ethylenic double bonds, 0.1 to 5% by weight, relative to the acrylate-containing monomer mixture, are employed for emulsion polymerization.

This polymerization in aqueous emulsion takes place in the presence of at least one water-soluble salt of a fatty acid containing 12 to 18 carbon atoms. The salt should be soluble in water to the extent of at least 0.5% by weight at 20° C.; sodium or ammonium salts are preferably employed. For example, the laurates, myristates, palmitates, isopalmitates or stearates are suitable, it also being possible to use mixtures of different fatty acid salts.

In addition to the fatty acid salts, the polymerization according to the invention is carried out in the presence of at least one alkali metal salt or ammonium salt of an alkylsulfonic acid having 8 to 20 carbon atoms and/or of an alkylarylsulfonic acid having 3 to 16 carbon atoms in the alkyl radical. Due to their ready accessibility, the dodecylbenzenesulfonates or dibutylnaphthalenesulfonates and alkylsulfonates having 11 to 18 carbon atoms, which may be present as a mixture, are preferred. 0.05 to 1% by weight, preferably 0.1 to 0.3% by weight, of the sulfonates mentioned, relative to vinyl chloride or the vinyl chloride monomer mixture used in the subsequent suspension polymerization in the presence of the polyacrylic acid dispersion is employed.

In the emulsion polymerization of the acrylate, 1 to 15 parts by weight, preferably 8 to 3 parts by weight, of the fatty acid salt or of the fatty acid salts are used per part by weight of sulfonate, with the minimum amount of fatty acid salt, relative to the acrylate-containing monomer mixture, should be at least 1% by weight.

The catalyst or initiator used for the emulsion polymerization is 0.05 to 1% by weight, preferably 0.2 to 0.5% by weight, relative to the acrylate-containing monomer mixture, of customary peroxidic compounds such as hydrogen peroxide, potassium persulfate or ammonium persulfate or of azo catalysts, for example azoisobutyronitrile or azobisdimethylvaleronitrile, is used. Together with the water-soluble peroxidic compounds, it is possible to employ water-soluble reducing compounds which are suitable for building up a redox catalyst system. Alkali metal bisulfites, hydrosulfites, thiosulfates and aldehydesulfoxylates, and also organic reducing compounds, for example ascorbic acid, are suitable, for example.

Before beginning the emulsion polymerization of the acrylate mixture, the pH of the polymerization mixture is adjusted to a value above 9, for example using ammonium hydroxide solution or alkali metal hydroxide solution. Polymerization is carried out at 40° to 90° C., expediently under normal atmospheric pressure, to a monomer conversion of at least 99%, preferably 99.8%, for which purpose 2 to 10 hours are generally required.

This emulsion polymerization can be carried out continuously or batchwise, but the semicontinuous method described, for example in Houben-Weyl "Methoden der organischen Chemie" [Methods of Organic Chemistry], Volume 14, Part 1, page 339, in which a relatively small part of the monomer dispersion is initially introduced, the polymerization is initiated, and both the aqueous monomer dispersion and catalyst or initiator are introduced during the polymerization, is preferably employed.

The aqueous polyacrylate dispersion produced as described above is subsequently used for suspension polymerization of vinyl chloride or of a vinyl chloride-containing monomer mixture. In this case, a process is followed according to the invention in which water, suspending agents, precipitants for the emulsifiers described above, catalysts, if appropriate further additives, and vinyl chloride and, if appropriate, further monomers which can be copolymerized with vinyl chloride are introduced into the polymerization vessel, and the aqueous dispersion, produced as described above, of the polyacrylate is then added while agitating the mixture, for example by stirring. In this process, the sequence in which the vinyl chloride or vinyl chloride-containing monomer mixture, the water, the suspending agent, the precipitant and the catalyst are introduced can be varied, but the aqueous polyacrylic acid dispersion should always be added last. Before, during or after this addition, the mixture is warmed to the polymerization temperature of 50° to 80° C. and polymerized, as customary, with stirring until the pressure has dropped by at least 0.1 MPa. The polymerization conversion should be 45 to 90% by weight, preferably 70 to 80% by weight, relative to the vinyl chloride monomer employed.

In the suspension polymerization, 1 to 5 parts by weight, preferably 1.5 to 3 parts by weight, of water are expediently used per part by weight of vinyl chloride or vinyl chloride-containing monomer mixture, not taking into account the polyacrylate dispersion added later. The amount of vinyl chloride to be used per part by weight of solid present in the polyacrylate dispersion depends on the vinyl chloride polymerization conversion and on the polyacrylate content intended in the polymer to be prepared according to the invention. If, for example, a polymer containing 40% by weight of polyacrylate units and 60% by weight of vinyl chloride units is to be prepared with a conversion of 70% by weight, $0.6 \times 0.4^1 \times 0.7^1 = 2.14$ parts by weight of monomeric vinyl chloride should be used per part by weight of solid in the polyacrylate dispersion.

Besides vinyl chloride, up to 10% by weight of the total amount of the monomers employed in the suspension polymerization can be monomers which can be copolymerized with vinyl chloride. One or more of the following monomers, for example, are suitable for this purpose: vinyl esters of straight-chain or branched carboxylic acids having 2 to 20, preferably 2 to 4, carbon atoms, such as vinyl acetate, vinyl propionate, vinyl butyrate and vinyl 2-ethylhexanoate; vinylisotridecanoic esters; vinylidene chloride; vinyl ethers; unsaturated acids, such as maleic acid, fumaric acid, acrylic acid and methacrylic acid, and the monoesters or diesters thereof with aliphatic alcohols having 1 to 10 carbon atoms; maleic anhydride, maleic imide and the N-substitution products thereof with aromatic, cycloaliphatic and optionally branched aliphatic substituents; acrylonitrile; and styrene. Particularly preferred comonomers are vinyl acetate and methacrylates having 1 to 8 carbon atoms in the alcoholic component.

0.05 to 1% by weight, preferably 0.1 to 0.5% by weight, relative to the monomer(s) employed in the suspension polymerization, of suspending agent is used. One or more of the following suspending agents are suitable: cellulose derivatives, such as alkyl- and hydroxyalkylcelluloses; for example methyl- or ethylcellulose and hydroxyethyl-or hydroxypropylcellulose, and the mixed ethers thereof, such as hydroxypropylmethylcellulose; alkyl vinyl ether/maleic acid copolymers; gelatin; and starch ethers. The suspending agent preferably employed is at least half of the total amount of suspending agent to be employed, of at least one polyvinyl alcohol which contains 5 to 25% by weight of acetate groups and has a viscosity of 4 to 30 mPa.s at 20° C., measured in 4% strength by weight aqueous solution, the pH of the mixture, produced before the polymerization, of water, suspending agent and precipitant for the emulsifiers employed in the emulsion polymerization of the alkyl acrylate being adjusted to a value below 9.

The suspension polymerization is carried out in the presence of 0.001 to 3% by weight, preferably 0.01 to 0.3% by weight, relative to the monomer(s) employed, of vinyl chloride-soluble catalysts which form free radicals. Suitable catalysts are, for example, diaryl peroxides or diacyl peroxides, such as diacetyl peroxide, acetylbenzoyl peroxide, dilauroyl peroxide, dibenzoyl peroxide, bis-2,4-dichlorobenzoyl peroxide and bis-2-methylbenzoyl peroxide; dialkyl peroxides, such as di-tertiary-butyl peroxide, peresters, such as tertiary-butyl percarbonate, tertiary-butyl peracetate, tertiary-butyl peroctanoate and tertiary-butyl perpivalate; dialkyl peroxydicarbonates, such as diisopropyl, diethylhexyl, dicyclohexyl and diethylcyclohexyl peroxydicarbonates; mixed anhydrides of organic sulfoperacids and organic acids, such as acetylcyclohexylsulfonyl peroxide; and azo compounds which are known as polymerization catalysts, such as azoisobutyronitrile.

Suitable precipitants for the emulsifiers used in the emulsion polymerization of the alkyl acrylate are, for example, salts of polyvalent metal cations and/or acids, for example hydrochloric acid, sulfuric acid, nitric acid, citric acid, formic acid or acetic acid. The preferred precipitant employed for the emulsifiers is at least one water-soluble alkaline earth metal salt or aluminum salt, the pH of the mixture, produced before the polymerization, of water, suspending agent and precipitant being adjusted to a value above 2 in a manner such that the precipitant exhibits no notable hydrolysis. Examples of suitable preferred precipitants are magnesium sulfate, calcium chloride, calcium acetate, barium chloride, barium nitrate, aluminum chloride and potassium aluminum sqlfate (alaun). At least sufficient of the precipitants is employed as theoretically necessary for complete precipitation of the emulsifiers used, a slight excess is expediently used.

When the monomer conversion desired has been achieved in the above-described suspension polymerization of vinyl chloride in the presence of the pre-polymerized polyacrylate dispersion, the batch is cooled and freed from remaining monomers by customary methods, the aqueous liquor is separated off, for example in a decanter centrifuge, and the moist polymer is dried as customary, for example in a pneumatic conveyor drier or a fluidized bed drier.

If particular demands are made on the graft polymers produced according to the invention with respect to shelf life at elevated temperature (30° to 50° C.), for example in silos or sacks stacked on pallets, a vinyl chloride polymer latex produced by a process known per se by polymerization in aqueous emulsion and whose polymer component has a glass transition point (Tg) of above 60° C. is, in a preferred embodiment of the invention, added to the suspension of the acrylate-containing graft polymer before removal of the majority of the water, for example by decanting in a centrifuge. The vinyl chloride polymer latex expediently contains 30 to 50% by weight of solid, relative to the latex, and not more than 3% by weight of emulsifier(s), relative to the solid. The amount of vinyl chloride polymer latex added is selected, taking into account its solids content and the solids content of the graft polymer suspension, so that 0.005 to 0.1 kg, preferably 0.01 to 0.05 kg, of latex solid are present per kg of graft polymer. After the latex has been added the mixture is expediently stirred for some time, then decanted and dried as usual.

The process of adding vinyl chloride polymer latex is advantageously used, in particular, in the case of high acrylate contents, for example 45 to 60% by weight of polymerized units of acrylate, in the graft polymer. Polymer powders are obtained which do not stick together, even under unfavorable storage conditions.

The polymer prepared according to the invention is preferably processed into moldings by extrusion, calendering using the injection-molding process or by other known processing processes, preferably mixed with vinyl chloride homopolymers and/or copolymers which contain, besides polymerized vinyl chloride units, up to 10% by weight of polymerized units of comonomers, with addition of customary processing auxiliaries, such as thermostabilizers, lubricants, optionally dyes, pigments and other additives. The mixture of the various polymers here is expediently adjusted so that it contains 2.5 to 10% by weight, preferably 4 to 7% by weight, of the acrylate elastomer (acrylate polymer) present in the polymer prepared according to the invention.

As stated in the introduction, the process according to the invention makes it possible to prepare polymers which are comparatively unsusceptible to faults in uniform quality with a good space-time yield. The polymers produced have high bulk densities and comparatively good porosity, which means that it is easy to remove residual monomers from them. The polymers prepared according to the invention exhibit improved processability and give moldings which have good impact resistance and good surface quality.

EXAMPLES

The following working examples are intended to illustrate the invention in greater detail. The property values indicated were determined as follows:
K value: in accordance with DIN 53726
Bulk density: in accordance with DIN 53468
Free-flowing ability: in accordance with DIN 53492
Plasticizer absorption: in accordance with DIN 53417

Grain-size distribution: using air-jet sieve analysis in accordance with DIN 53734
Impact resistance: in accordance with DIN 53453, using notched test specimens at 23° C. (aK23) and at 0° C. (aK$_0$)
Surface quality: visually in accordance with the following scale: 1=very good; 2=good; 3=satisfactory
Residual vinyl chloride content in the polymer: by gas chromatography using the "head space" method (Zeitschrift fur analytische Chemie 255 (1971), pages 345 to 350)
Particle size in the poly acrylate dispersion prepared in aqueous emulsion: using the "Nanosizer" from Coulter Electronics, Krefeld, pared in aqueous emulsion: FRG

Shelf life

The following apparatus is used: A horizontal plate is provided with vertical cylindrical projections with a diameter of 4 cm and a height of 4 cm which are closed at the top. Sleeves of internal diameter 4 cm and length 15 cm are placed vertically on the plate so that the projections enter these sleeves and ensure that the latter are held. 60 g of the polymer powder to be tested are introduced into each sleeve, followed by a cylindrical metal stamp of diameter 3.95 cm, length 23 cm and weight 2.2 kg. The stamp exerts a pressure of 17.6 kN/m$^2$. This arrangement is kept at 60° C. for 72 hours, then cooled to room temperature, the sleeve is removed from the plate, the polymer is carefully pressed out of the sleeve using the metal stamp, if necessary, and assessed according to the following scale:
1) The polymer flows out of the sleeve without assistance and contains no clumps
2) The polymer contains clumps, but they crumble to a powder on gentle finger pressure
3) The polymer forms a coherent cylindrical body, but the latter crumbles to a powder, maybe containing small agglomerates, on gentle finger pressure
4) The polymer forms a compact cylindrical body which does not crumble on finger pressure.

In order to grade 4) further, the fracture strength of the cylindrical polymer body is measured as follows: the polymer body is placed, with the cylinder axis horizontal, onto two 1 cm-thick supports, at a distance of 3.6 cm from one another, with semi-circular cut-outs. A semicircular metal ring is placed over the polymer body in the center between the supports and a plastic container of capacity 3 dm$^3$ is mounted on cords at the outer ends of the ring in a manner such that it is suspended below the polymer body with the opening facing up. The metal ring has an internal diameter of 4 cm, an external diameter of 7 cm and a trapezoidal cross-section (internal area 3 mm broad; external area 10 mm broad). For the measurement, water is let into the container from a calibrated vessel until the polymer body breaks. The breaking strength in kN/m$^2$ of the cross-sectional area of the polymer body is determined from the amount of water and the known empty weight of the container, of the suspension system and of the metal ring. The value is noted in the table below in parentheses after the grade 4.

Example 1

The following liquids are prepared:

| Monomer emulsion: | |
|---|---|
| demineralized water | 53 kg |
| n-butyl acrylate | 139 kg |
| diallyl phthalate | 0.52 kg |
| sodium salt of dodecyl-benzenesulfonic acid | 0.53 kg |
| ammonium laurate | 2.5 kg |

This monomer emulsion contains: 0.374% by weight of a compound containing two non-conjugated ethylenic double bonds (diallyl phthalate), relative to the acrylate-containing monomer mixture.

| Emulsifier solution: | |
|---|---|
| demineralized water | 4.0 kg |
| ammonium laurate | 1.4 kg |
| initiator solution I: | |
| demineralized water | 7.5 kg |
| ammonium persulfate | 0.38 kg |
| Na$_2$S$_2$O$_5$ | 0.04 kg |
| initiator solution II: | |
| demineralized water | 2.5 kg |
| ammonium persulfate | 0.115 kg |
| Na$_2$S$_2$O$_5$ | 0.022 kg |

In a polymerization reactor of capacity 300 cm$^3$ equipped with stirrer, the atmospheric oxygen is expelled using nitrogen, and then the following are metered in:

| demineralized water | 74 kg |
|---|---|
| monomer emulsion | 0.8 kg |
| sodium salt of dodecyl-benzenesulfonic acid | 0.07 kg |
| ammonia | 0.083 kg |
| Na$_2$S$_2$O$_5$ | 0.017 kg |
| ammonium persulfate | 0.165 kg |

The mixture is warmed to 70° C. while stirring. 5 minutes later, continuous metered addition of the remainder of the monomer emulsion and of the initiator solution I is commenced and continued for 3.5 hours. The emulsifier solution is then added, and, after the initiator solution II has been added, the mixture is stirred for a further 2 hours and then cooled.
The following values are determined:
conversion > 99.9%
solids content of the dispersion > 50.2% by weight
particle size > 170 nm
The pH of the mixture on commencement of the polymerization is greater than 9.
In total, 2.7% by weight of ammonium laurate are employed, relative to the acrylate-containing monomer mixture. 6.5 parts by weight of ammonium laurate are used per part by weight of the sodium salt of dodecylbenzenesulfonic acid.
For the subsequent suspension polymerization, the following are metered into a polymerization reactor of capacity 400 dm³ equipped with stirrer and temperature-controlled twin jacket:

| | |
|---|---|
| demineralized water | 165 kg |
| polyvinyl alcohol containing 15.7% by weight of acetate groups and having a viscosity, of the 4% strength by weight aqueous solution, of 15 mPa.s at 20° C. | 0.23 kg |
| methylhydroxypropyl cellulose having a viscosity, of the 2% strength by weight solution, of 100 mPa.s at 20° C. | 0.038 kg |
| lauroyl peroxide | 0.061 kg |
| calcium nitrate | 0.76 kg |
| aqueous nitric acid containing 65% by weight of $HNO_3$ | 0.175 kg |

The pH of this mixture is 2.3.

The polymerization reactor is now sealed, the atmospheric oxygen present therein is expelled, and 76 kg of vinyl chloride are metered in per minute at a stirrer speed of 50 revolutions per minute. 84 kg of the polyacrylate dispersion prepared as above are subsequently added, the jacket of the polymerization reactor is then heated to 65° C., and the mixture is kept at this temperature until the vinyl chloride residual pressure is 5 bar. The mixture is then cooled, and the polymer dispersion produced is freed from residual monomers by customary methods.

0.154 kg of the sodium salt of dodecylbenzenesulfonic acid are present in the polyacrylate dispersion employed, i.e. 0.2% by weight, relative to the vinyl chloride employed. The vinyl chloride conversion to the polymer is 70% by weight, and the polyacrylate content of the polymer produced is 45% by weight. When the polymerization is complete, no reactor coating at all has formed.

The suspension is divided into three equal parts. 400 g of a vinyl chloride polymer latex containing 40% by weight of solids, 1.1% by weight of ammonium laurate and 1.3% by weight of sodium lauryl sulfate, relative to the solid, and whose polymer component has a glass transition point (Tg) of 80° C. are added to the first part, i.e. 0.005 kg of latex solid per kg of the acrylate-containing graft polymer (sample 1a). 2,400 g of the above-described vinyl chloride polymer latex are added to the second part, i.e. 0.03 kg of latex solid per kg of the acrylate-containing graft polymer (sample 1b). No additives are added to the third part (sample 1). The majority of the aqueous liquor is decanted immediately from the third part, and after stirring for 10 minutes from the first and second parts, and the moist polymer is dried. The shelf life is determined for all 3 samples, and for the polymer prepared in accordance with comparative experiment A described below. The values determined are listed in Table I below:

TABLE I

| | Grade | Shelf life (breaking strength, $kN/m^2$) |
|---|---|---|
| Comparative experiment A* | 4 | (25) |
| Example 1 Sample 1 | 3 | — |
| Example 1 Sample 1a | 2 | — |
| Example 1 Sample 1b | 1 | — |

*See below for details on the preparation of the polymer

The polymer prepared according to the invention as described above is processed into profile moldings with the following recipe using a Weber DS 85 extruder:

| | |
|---|---|
| 85 parts by weight | of suspension homopolymer of K value 68 |
| 15 parts by weight | of acrylate/vinyl chloride polymer prepared according to the invention |
| 2.0 parts by weight | of barium/cadmium laurate |
| 0.5 part by weight | of organic lead phosphite |
| 0.3 part by weight | of oxystearic acid |
| 0.5 part by weight | of neutral dicarboxylates of saturated fatty alcohols (drip point 42 to 46° C.) |
| 1.0 part by weight | of epoxidized soybean oil |
| 0.5 part by weight | of paraffinic hydrocarbons (softening point 54° C.) |
| 7 parts by weight | of precipitated calcium carbonate |
| 4 parts by weight | of titanium dioxide. |

During extrusion, the current consumption of the extruder is measured as a measure of the processability of the mixture.

the galss transition temperature, measured by differential thermoanalysis, of the butyl acrylate polymer prepared by emulsion polymerization is −40° C.

The properties measured for the acrylate/vinyl chloride polymer and the profile molding produced therefrom are listed in Table II below.

Comparative experiment A

The procedure followed is as in Example 1, but the total of 0.6 kg of the sodium salt of dodecylbenzenesulfonic acid (HLB value about 20) is replaced, in the emulsion polymerization of the butyl acrylate, by the same amount of sodium lauryl sulfate (HLB value greater than 40). A conversion of 99.9% is achieved in the emulsion polymerization, and the aqueous polyacrylate dispersion produced has a solids content of 49.7%, and the particle size of the solid is 150 nm.

The subsequent suspension polymerization is carried out as described in Example 1. The vinyl chloride conversion is 70% by weight, relative to the monomeric vinyl chloride employed, and the acrylate/vinyl chloride copolymer produced has an acrylate content of 45% by weight, relative to the polymer. The polymer is processed into a profile molding as described in Example 1. The values measured for the acrylate/vinyl chloride polymer and the profile molding produced therefrom are listed in Table II below.

Example 2

The procedure is as in Example 1, but a monomer emulsion is prepared from the following substances for emulsion polymerization of the acrylate:

| | |
|---|---|
| demineralized water | 53 kg |
| 2-ethylhexyl acrylate | 139 kg |
| butanediol diacrylate | 1.0 kg |
| sodium salt of an n-alkanesulfonic acid mixture having various chain lengths of $C_{12}$ to $C_{16}$, with a predominant content of $C_{14}$ | 0.42 kg |
| ammonium laurate | 2.5 kg |

The amounts specified in Example 1 are introduced into the polymerization reactor, but the 0.07 kg of the sodium salt of dodecylbenzenesulfonic acid is replaced by 0.08 kg of the above-described sodium salt of the n-alkanesulfonic acid mixture.

When the polymerization is complete, the conversion is 99.9%, and the polyacrylate dispersion produced has a solids content of 50% by weight and a solid particle size of 155 nm. The glass transition temperature of the polymer produced, measured using differential thermoanalysis, is −40° C.. 2.6% by weight of ammonium laurate are employed, relative to the acrylate-containing monomer mixture, and 7.8 part by weight of ammonium laurate are used per parts by weight of the sodium salt of the n-alkanesulfonic acid mixture. The acrylate-containing monomer mixture contains 0.67% by weight, relative to the mixture, of a compound containing two ethylenically unsaturated, non-conjugated double bonds.

The subsequent suspension polymerization is again carried out as described in Example 1, the following substance amounts being employed:

| | |
|---|---|
| demineralized water | 140 kg |
| vinyl chloride | 100 kg |
| polyvinyl alcohol containing 21.6% by weight of acetate groups having a viscosity, measured in 4% strength by weight aqueous solution at 20° C., of 5 mPa.s | 0.2 kg |
| methylhydroxyethylcellulose having a viscosity, measured in 2% strength by weight aqueous solution at 20° C., of 400 mPa.s | 0.04 kg |
| copolymer of vinyl ether and maleic anhydride (Gantrez ® 169, supplied by General Aniline and Film Corporation, USA) | 0.1 kg |
| lauroyl peroxide | 0.08 kg |
| aluminum sulfate | 0.5 kg |
| nitric acid (65% by weight of HNO₃) | 0.175 kg |
| poly-2-ethylhexyl acrylate dispersion prepared as described above | 94 kg |

When the polymerization is complete, the vinyl chloride conversion is 70%, and the polymer produced has an acrylate content of 40% by weight. 0.14% by weight of sodium salt of the n-alkanesulfonic acid mixture is used in the emulsion polymerization, relative to the vinyl chloride employed.

The properties of the acrylate/vinyl chloride polymer thus prepared and of the profile molding produced therefrom as described in Example 1 can be seen from Table II below.

Example 3

The procedure is again as described in Example 1, and the following monomer emulsion is used in the emulsion polymerization:

| | |
|---|---|
| demineralized water | 53 kg |
| 2-ethylhexyl acrylate | 53 kg |
| allyl methacrylate | 0.5 kg |
| vinylidene chloride | 86 kg |
| sodium salt of dodecyl-benzenesulfonic acid | 0.52 kg |
| ammonium laurate | 2.5 kg |

When the polymerization is complete, the conversion is greater than 99.9%, the solids content of the dispersion produced of the copolymer of 2-ethylhexyl acrylate and vinylidene chloride is 50% by weight, and the particle size of the solid is 150 nm. The copolymer has a vinylidene chloride content of 61.6% by weight and, measured using differential thermoanalysis, a glass transition temperature of −17° C. 2.7% by weight of ammonium laurate are used, relative to the acrylate-containing monomer mixture. The monomer mixture contains 0.35% by weight, relative to he mixture, of a compound containing 2 ethylenically unsaturated, non-conjugated double bonds. 6.6 part by weight of ammonium laurate are used per part by weight of the sodium salt of dodecylbenzenesulfonic acid.

The subsequent suspension polymerization is again carried out as described in Example 1, the following substance amounts being employed:

| | |
|---|---|
| demineralized water | 41 kg |
| vinyl chloride | 100 kg |
| polyvinyl alcohol containing 15.7% by weight of acetate groups and having a viscosity, measured in 4% strength by weight aqueous solution at 20° C., of 15 mPa.s | 0.075 kg |
| methylhydroxypropylcellulose having a viscosity, measured in 2% strength by weight aqueous solution at 20° C., of 50 mPa.s | 0.15 kg |
| sorbitan monolaurate | 0.2 kg |
| azoisobutyronitrile | kg |
| calcium chloride | 0.4 kg |
| citric acid | 0.3 kg |
| dispersion, prepared as described in greater detail above, of the copolymer of 2-ethylhexyl acrylate and vinylidene chloride | 84 kg |

When the polymerization is complete, the conversion is 80% by weight, relative to vinyl chloride. The polymer produced contains 13.1% by weight of 2-ethylhexyl acrylate units and 21.4% by weight of vinylidene chloride units. 0.15% by weight of the sodium salt of dodecylbenzenesulfonic acid is used in the emulsion polymerization of the acrylate monomer mixture, relative to vinyl chloride.

The properties of the acrylate/vinylidene chloride/vinyl chloride polymer and of the profile molding produced therefrom as described in Example 1 can be seen from Table II below.

TABLE II

Properties of the acrylate/vinyl chloride polymers and of the profile moldings produced therefrom:

| Example/ comparative experiment | Polymer | | | | | | | | Residual vinyl chloride ppm+ |
|---|---|---|---|---|---|---|---|---|---|
| | Acrylate content % by weight | Bulk density g/dm³ | Free-flowing ability s | Plasticizer absorption % | Grain size | | | | |
| | | | | | <63 μm | <125 μm | <250 μm | <500 μm | |
| A | 45 | 615 | 32 | 2.1 | 82 | 44 | 15 | 2 | 54 |
| 1 | 45 | 580 | 17 | 12 | 100 | 60 | 12 | 0 | <1 |

TABLE II-continued

Properties of the acrylate/vinyl chloride polymers and of the profile moldings produced therefrom:

| | | | | | | | | | |
|---|---|---|---|---|---|---|---|---|---|
| 2 | 40 | 560 | 15 | 14 | 100 | 75 | 17 | 0 | n.d. |
| 3 | 13.1[4] | 580 | 21 | 10.5 | 100 | 43 | 2 | 0 | n.d. |

| | | | Profile moldings | | | | |
|---|---|---|---|---|---|---|---|
| Example/ comparative experiment | S-PVC parts by weight[1] | Poly ACE-VC parts by weight[2] | Poly ACE content % by weight[3] | Impact resistance kJ/m$^2$ aK$_{23}$ | aK$_0$ | Profile surface grade | Extruder current consumption (A) |
| A | 85 | 15 | 6.75 | 19 | 5 | 3 | 18 |
| 1 | 85 | 15 | 6.75 | 54 | 12 | 1 to 2 | 14 |
| 2 | 87.5 | 12.5 | 5 | 41 | 11 | 1 | 13 |
| 3 | 81.5 | 18.5 | 6.38 | 48 | 10 | 2 | 12 |

Footnotes to Table II:
+Parts by weight per 1,000,000 parts by weight of polymer
[1]Suspension vinyl chloride homopolymer
[2]Acrylate/vinyl chloride polymer
[3]Polyacrylate or (in Example 3) polyacrylate/vinylidene chloride copolymer content of the polymer mixture
[4]In addition 21.4% by weight of polymerized vinylidene chloride units, and a total of 34.5% by weight of acrylate/vinylidene chloride copolymer
n.d. = not determined Footnotes to Table II: +) Parts by weight per 1,000,000 parts by weight of polymer 1) Suspension vinyl chloride homopolymer 2) Acrylate/vinyl chloride polymer 3) Polyacrylate or (in Example 3) polyacrylate/vinylidene chloride copolymer content of the polymer mixture 4) In addition 21.4% by weight of polymerized vinylidene chloride units, and a total of 34.5% by weight of acrylate/vinylidene chloride copolymer n.d.=not determined

We claim:

1. A process for the preparation of a polymer containing polymerized units of vinyl chloride and 30 to 60% by weight, relative to the polymer, of polymerized units of at least one acrylate, optionally with further monomers which can be copolymerized with acrylates, said process comprising the steps of:
   (a) polymerizing in an aqueous emulsion of the acrylate, optionally with further monomers, with a monomer containing at least two ethylenically unsaturated, non-conjugated double bonds, said polymerizing being carried out in the presence of a water-soluble salt of a fatty acid containing 12 to 18 carbon atoms as an emulsifier having an initial pH of greater than 9 and at least one alkali metal salt or ammonium salt of an alkylsulfonic acid having 8 to 20 carbon atoms or of an alkylarylsulfonic acid having 3 to 16 carbon atms in the alkyl radical, or mixtures thereof as a further emulsifier, resulting in the formation of a polyacrylate dispersion whose glass transition temperature is below 0° C.
   (b) subsequently charging into a polymerization vessel water, at least one suspending agent, at least one vinyl chloride-soluble catalyst which forms free radicals, and at least one precipitant for the emulsifiers being employed in step (a) followed by the vinyl chloride, optionally with monomers which can be copolymerized with vinyl chloride;
   (c) adding the polyacrylate dispersion of step (a);
   (d) polymerizing the resulting aqueous suspension of vinyl chloride by warming it to polymerization temperatures ranging from 50° to 80° C.; and
   (e) cooling, releasing the pressure and working up to the dry polymer.

2. The process as claimed in claim 1, wherein the precipitant employed for the emulsifiers is at least one water soluble alkaline earth metal salt or aluminum salt, the pH of the mixture of water, suspending agent and precipitant being adjusted to a value above 2 in a manner such that the precipitant exhibits no notable hydrolysis.

3. The process as claimed in claim 1, wherein the suspending agent employed is at least one polyvinyl alcohol which contains 5 to 25% by weight of acetate groups and has a viscosity of 4 to 30 mPa.s at 20° C., measured in 4% strength by weight aqueous solution, the pH of the mixture of water, suspending agent and precipitant for the emulsifiers being adjusted to a value below 9.

4. The process as claimed in claim 1, wherein an acrylate whose homopolymer has a glass transition temperature of below −15° C. is employed for the emulsion polymerization.

5. The process as claimed in claim 1, wherein the copolymerizable monomer employed for the emulsion polymerization is vinylidene chloride in addition to acrylate.

6. The process as claimed in claim 1, wherein, besides acrylate or acrylate and further monomers, 0.1 to 5.0% by weight, relative to the acrylate, of a monomer containing at least 2 ethylenically unsaturated, non-conjugated double bonds are employed in the emulsion polymerization.

7. The process as claimed in claim 1, wherein, before the suspension polymerization batch is worked up by removing the majority of the aqueous liquor, a vinyl chloride polymer latex prepared in aqueous liquor by emulsion polymerization, whose polymer component has a glass transition point (Tg) of greater than 60° C. and which contains 30 to 50% by weight, of solid, relative to the latex, and a maximum of 3% by weight of one or more emulsifiers, relative to the solid, is added to the polymer which contains polymerized units of vinyl chloride and 30 to 60% by weight, relative to the polymer, of polymerized units of at least one acrylate or at least one acrylate and further monomers which can be copolymerized with acrylates, in an amount such that 0.005 to 0.1 kg of latex solid is present per kg of acrylate-containing polymer, the mixture is then stirred, the majority of the aqueous liquor is removed from the polymer mixture, and the latter is dried.

* * * * *